United States Patent
Takada Chino et al.

(10) Patent No.: US 10,541,820 B2
(45) Date of Patent: Jan. 21, 2020

(54) DISTRIBUTED DIGITAL LEDGER

(71) Applicant: Global Bonsai LLC, New York, NY (US)

(72) Inventors: Fabio Jun Takada Chino, Sao Paulo (BR); Ricardo Orsi, Sao Paulo (BR); Cesar Luiz Ferraz, Sao Paulo (BR)

(73) Assignee: GLOBAL BONSAI LLC, New York, NY (US)

( * ) Notice: Subject to any disclaimer, the term of this patent is extended or adjusted under 35 U.S.C. 154(b) by 142 days.

(21) Appl. No.: 15/679,783

(22) Filed: Aug. 17, 2017

(65) Prior Publication Data

US 2019/0058599 A1   Feb. 21, 2019

(51) Int. Cl.
| | | |
|---|---|---|
| G06F 21/64 | (2013.01) | |
| H04L 9/32 | (2006.01) | |
| H04L 9/30 | (2006.01) | |
| G06F 21/60 | (2013.01) | |

(52) U.S. Cl.
CPC .......... *H04L 9/3249* (2013.01); *G06F 21/602* (2013.01); *G06F 21/64* (2013.01); *H04L 9/302* (2013.01); *H04L 9/3013* (2013.01); *H04L 9/3239* (2013.01); *H04L 9/3247* (2013.01); *H04L 9/3252* (2013.01); *H04L 2209/38* (2013.01)

(58) Field of Classification Search
CPC ...................................................... G06F 21/64
See application file for complete search history.

(56) References Cited

U.S. PATENT DOCUMENTS

| | | |
|---|---|---|
| 6,381,696 B1 | 4/2002 | Doyle |
| 2015/0188945 A1 | 7/2015 | Kjeldaas |
| 2015/0236856 A1 | 8/2015 | Moore et al. |
| 2016/0218879 A1 | 7/2016 | Ferrin |
| 2017/0033932 A1 | 2/2017 | Truu et al. |
| 2017/0228371 A1 | 8/2017 | Seger, II |

FOREIGN PATENT DOCUMENTS

WO    2017/006136    1/2017

OTHER PUBLICATIONS

International Search Report for PCT/US2018/044302 dated Dec. 12, 2018 (4 pages).
Bernstein et al., High-speed high-security signatures, J. Cryptogr. Eng., Aug. 2012.
ElGamal, A Public Key Cryptosystem and a Signature Scheme Based on Discrete Logarithms, IEEE Transactions on Information Theory, Jul. 1985.
FIP S PUB 180-4 Secure Hash Standard, National Institute of Standards and Technology, Aug. 2015.

(Continued)

*Primary Examiner* — Josnel Jeudy
(74) *Attorney, Agent, or Firm* — Edward Ryan, Esq.

(57) ABSTRACT

Methods and systems for generating a new record in a digital ledger include hashing a payload, public key, and signature of a parent record to generate a hash value. A new record is created with a new payload and a new public key. The hash value is combined with the new payload and the new public key to generate a message value. A signature of the new record is generated using the message value and a private key corresponding to the public key of the parent record. The signature of the new record is added to the new record.

15 Claims, 14 Drawing Sheets

(56) References Cited

OTHER PUBLICATIONS

Jakobsson et al., Proofs of Work and Bread Pudding Protocols, Secure Information Networks, Sep. 1999.
Jonsson et al., Public-Key Cryptography Standards (PKCS) #1: RSA Cryptography Specifications Version 2.1, IEFT, Feb. 2003.
Kerry et al., Digital Signature Standard (DSS), Information Technology Laboratory, National Institute of Standards and Technology, Jul. 2013.
Krawczyk et al., HMAC: Keyed-Hashing for Message Authentication, IEFT, Feb. 1997, https://tools.ieft.org/html/rfc2014 accessed Feb. 3, 2016.
Nakamoto, Bitcoin: A Peer-to-Peer Electronic Cash System, Oct. 2008.
Rijmen et al., The Whirlpool Hash Function, http://www.larc.usp.br/~pbarreto/WhirlpoolPage.html, Accessed May 17, 2017.
Swenson, NIST Selects Winner of Secure Hash Algorithm (SHA-3) Competition, National Institute of Standards and Technology, Oct. 2012.
Zimmerman, Why I wrote PGP, Part of the Original 1991 PGP User's Guide (updated in 1999), https://www.philzimmermann.com/EN/essays/WhyIWrotePGP.html, Accessed Jun. 2, 2017.
Hearn, The resolution of the Bitcoin experiment,—Mike's blog, https://blog.plan99.net/the-resolution-of-the-bitcoin-experiment-dabb30201f7, Accessed May 10, 2017.

DISTRIBUTED DIGITAL LEDGER

BACKGROUND

Technical Field

The present invention generally relates to distributed file storage and, more particularly, to a reliable and scalable distributed digital ledger.

Description of the Related Art

Blockchain technologies, which were introduced with the creation of bitcoin, provide a digital ledger that is distributed and freely inspected and is at the same time resistant to tampering. Such digital ledgers ensure the integrity of the information stored inside them by organizing data into sequential blocks that are linked with one another by a cryptographic puzzle that is based on partial matches of a cryptographic hashing algorithm that is performed over new records added to the ledger. Each block also includes a hash of the previous block, thereby linking it to the previous block.

While the cryptographic puzzle in such ledgers is easily verified, the solution can only be discovered by brute force, trial and error approaches. This means that a block will be added to the blockchain only when a certain amount of processing power has been exerted. This is referred to as a "proof of work" security system, where a single individual should not have enough resources to forge records in the blockchain without the collaboration of the entire network.

However, such a system is vulnerable if the processing power is concentrated in the hands of a few entities. Furthermore, the power and infrastructural costs needed to maintain such a network are significant.

SUMMARY

A method for generating a new record in a digital ledger includes hashing a payload, public key, and signature of a parent record to generate a hash value. A new record is created with a new payload and a new public key. The hash value is combined with the new payload and the new public key to generate a message value. A signature of the new record is generated using the message value and a private key corresponding to the public key of the parent record. The signature of the new record is added to the new record.

A method of validating a current record in a digital ledger includes computing a hash of a parent payload, a parent public key, and a parent signature from a parent record to generate a parent hash value. The hash value is combined with a payload of a current record and a public key for the current record to generate a current message value. The current message value is verified using the parent public key and a signature of the current record according to a cryptographic system.

A digital ledger system includes a hashing module configured to compute a hash of a value, a joining module configured to join multiple input values into a single output bit value, a signing/verifying module configured to produce a signature of a value using a private key and to verify the authenticity of a value using a public key associated with the private key, and a key module configured to generate key pairs, each key pair having an associated private key and public key. A new record module is configured hash a payload, public key, and signature of a parent record to generate a hash value using the hashing module, to create a new record with a new payload and a new public key, to combine the hash value with the new payload and the new public key to generate a message value using the joining module, to generate a signature of the new record using the message value and a private key corresponding to the public key of the parent record using the signing/verifying module, and to add the signature of the new record to the new record.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present embodiments provide a distributed digital ledger based on a network of trust. Each member has a respective digital ledger that is used to store information and to certify the integrity of other ledgers in the network, thus creating a chain of trust. Each ledger is formed from a list of immutable, self-verifiable records that can ensure the order, integrity, and owner of the list.

Figure 1:
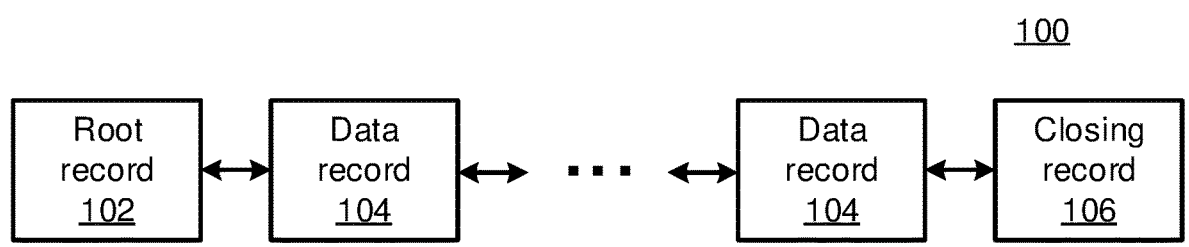
FIG. 1 is a block diagram showing the relationship between records in a digital ledger in accordance with an embodiment of the present invention.

Referring now to the drawings in which like numerals represent the same or similar elements and initially to FIG. 1, an exemplary digital ledger 100 is shown. A complete ledger 100 begins with a root record 102, includes one or more data records 104, and is terminated with a closing record 106. Each record is linked to its parent record using a digital signature that signs the hash of the parent block and the data of the record itself. The public key used to verify the record is stored in that record's parent. The public key that will be used to verify the record's child is also stored in the record itself. In other words, a parent record stores the information needed to check the integrity of its child record, while the child record includes a hash of its parent, marking the parent as the child record's only parent record.

A complete ledger 100 that includes a closing record 106 cannot be changed. An incomplete digital ledger will lack a closing record, and the owner of the incomplete ledger can add new data records 104 at the end of the incomplete ledger. Because the owner of the digital ledger is the only one who knows the current signing key, the owner is the only one capable of adding new records to the list. However, anyone will be able to verify the integrity of the list as long as all records are available, due to the nature of digital signatures.

When verifying a record, once the root record 102, or any other record prior to the record being verified, is confirmed to be associated to a given owner, the present embodiments ensure that this owner is the only one who has the ability to create a new record, because the owner holds the private key that corresponds to the public key being used to create the record. Similarly, if a given record is known to be valid, the present embodiments ensure that all records prior to the known-valid record are also valid. The digital ledgers of the present embodiments thereby implement a list of permanent records without the use of a proof-of-work system.

In a digital ledger 100, each record is considered the parent of the next entry, with the exception of the last entry in the list. For an incomplete ledger, the last record may have a new record added as a child, while for a complete ledger, the closing record 106 cannot have any child records. Similarly, each record in the ledger other than the root record 102 is the child of the previous record. Each record can have only child, such that the ledger never branches or forms a tree structure.

Each record in the digital ledger 100, other than the closing record 106, includes the public key that will be used to verify the signature of its child record. When a record is created, the new record is signed with a private key associated with the public key stored in its parent record, such that the parent record can verify the authenticity of its child record. The only exception to this is the root record 102, which is signed with the same key that is used to sign its child. Because the root record 102 therefore cannot be verified by information stored in the digital ledger 100, the root record is used as an identifier of the entire digital ledger 100 and is certified by some external process. It is particularly contemplated that cross-certification in a community may be used to certify the root record 102 of a digital ledger 100, as will be described in greater detail below, but it should be understood that other mechanisms may be used to certify the root record 102 instead, for example in the form of a centralized certifying authority.

Each data record 104 stores the information payload of the digital ledger 100. As noted above, each data record 104 will have a single parent record and is the sole child record of that parent record. The last data record 104 may have a closing record 106 as its child.

The closing record 106 is always the last record in a complete digital ledger 100. The presence of a closing record 106 marks the digital ledger 100 as being closed, preventing the addition of new records. To accomplish this, the closing record 106 is created without a public key that could link to a child record. Every complete digital ledger 100 should end with a closing record 106. In the event that the owner of an incomplete digital ledger loses the ability to add new records (e.g., by losing the state of the ledger), then a final data record may be turned into a closing record using an external validation process, as described in greater detail below.

Figure 2:
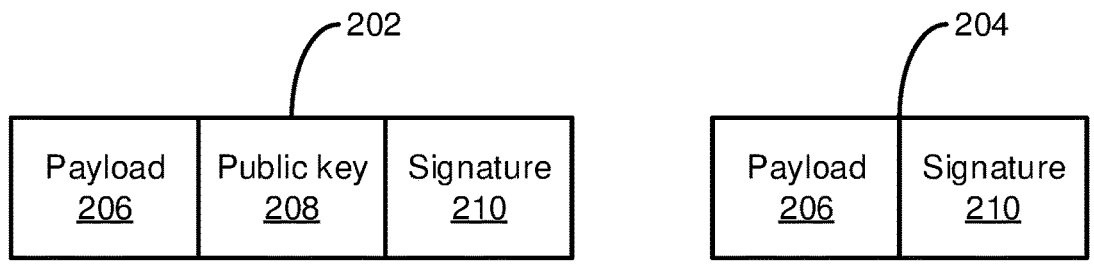
FIG. 2 is a block diagram showing the structure of root records, data records, and closing records in a digital ledger in accordance with an embodiment of the present invention.

Referring now to FIG. 2, a first record structure 202 is shown for the structure of a root record 102 and data record 104 and a second record structure 204 is shown for the structure of a closing record 106.

A payload 206 in each record is a free-form data field that holds the information stored in the record. Its format and content are defined by the application that uses the digital ledger 100 for storage and will be defined by the person implementing the digital ledger 100. The payload 206 of the root record 102 may be used to add information that identifies the instance of the digital ledger 100, for example identifying the owner, an emergency key used to close the digital ledger 100 in case the private key for a new record is lost, and purpose of the digital ledger 100, but it should be understood that the payload 206 of the root record 102 may instead be used for any other purpose needed by the implementer. The payload 206 of the closing record 106 may similarly be used to store information relating to, e.g., the reason for terminating the digital ledger 100.

A public key 208 is provided in the first record structure 202 and is used to verify the signature of the next record in the digital ledger 100. The second record structure 204 for the closing record 106 does not include the public key 208, which enforces the inability of the closing record 106 to have a child record added.

A signature 210 ensures the integrity of the record itself. On data records 104, the signature 210 is the signature of a combination of a hash of the parent record, the payload 206 of the present record, and public key 208 of the next record. The signature 210 is formed using a private key that is associated with the public key 208 of the parent record. In the closing record 106, the signature 210 is signed based on only the hash of the parent record and the payload 206, because there is no public key for a subsequent record.

On the root record 102, the signature uses an arbitrary value in place of the hash of the previous record, since the root record 102 has no parent record. The hash, the payload 206, and the public key 208 are then signed using the same private key as is used to sign the next record, making the root record 102 the only self-signed record in the digital ledger 100.

Figure 3:
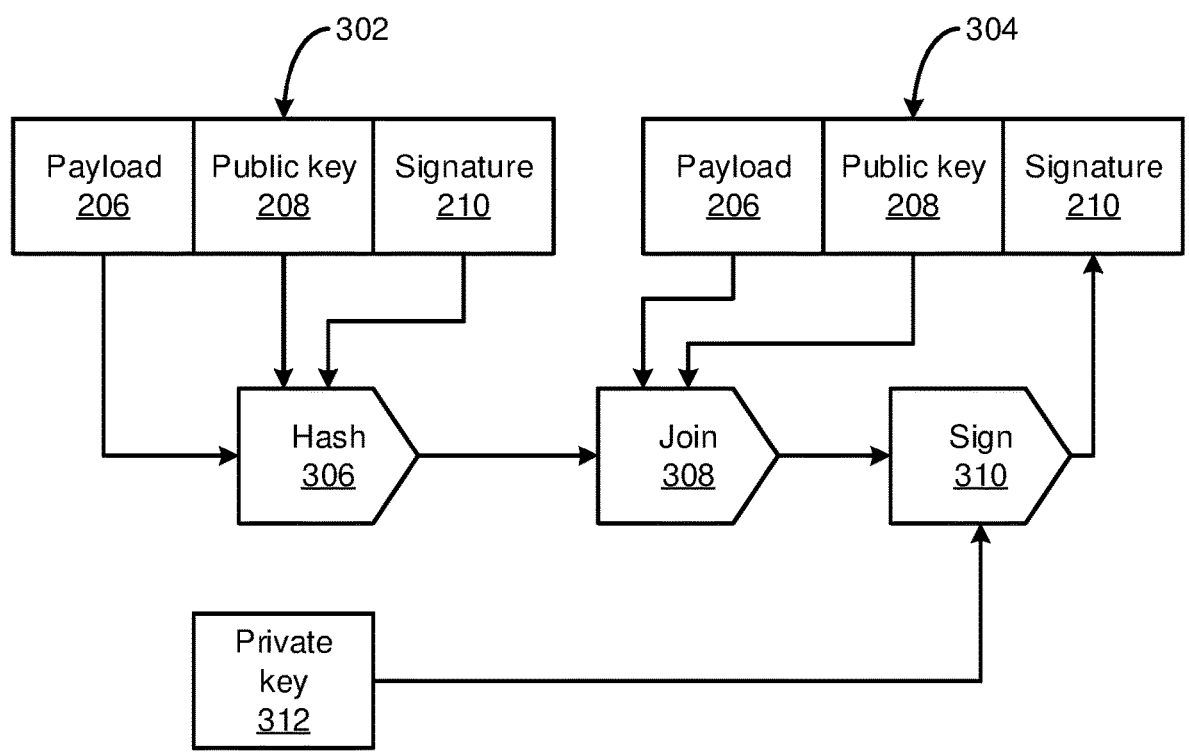
FIG. 3 is a block diagram showing the creation of a new data record in a digital ledger in accordance with an embodiment of the present invention.

Referring now to FIG. 3, the above-described relationships between a root record 102 or a data record 104 and a subsequent data record 104 is shown. A first record 302 and a second record 304 are shown, the second record 304 being the child of the first record 302.

A hash function 306 is used to compute a fingerprint of the first record 302. The hash function 306 may be selected from any known or novel cryptographic hash function including, e.g., Secure Hash Algorithm (SHA) 2, SHA-3, Whirlpool, etc. The hash function that is selected should be resistant against a second preimage attack. In some embodiments, multiple different hash algorithms from distinct cryptographic families may be used and their respective results concatenated.

The output of the hash function 306 is then combined by join function 308 with the payload 206 and the public key 208 of the second record 304. It is specifically contemplated that the join function 308 may be implemented simply as a concatenation of the respective bitstreams of these values, but it should be understood that a hash message authentication code (HMAC) or any other appropriate join function may be used instead as long as all of the input values are fully represented.

The output of the join function 308 is then signed by signing function 310 to produce the signature 210 of the second record 304. The signing function 310 uses a private key 312 that is associated with the public key 208 stored in the first record 302. The signing function 310 may be implemented as any appropriate digital signature algorithm that is considered secure at the time of implementation. Exemplary digital signature algorithms include, e.g., RSA, DSA, ECDSA, ElGamal, EdDSA, etc. It should be noted that the choice of the signing algorithm will, in part, determine the roles of the public key 208 portion, the private key 312, and the signature portion 210.

Figure 4:
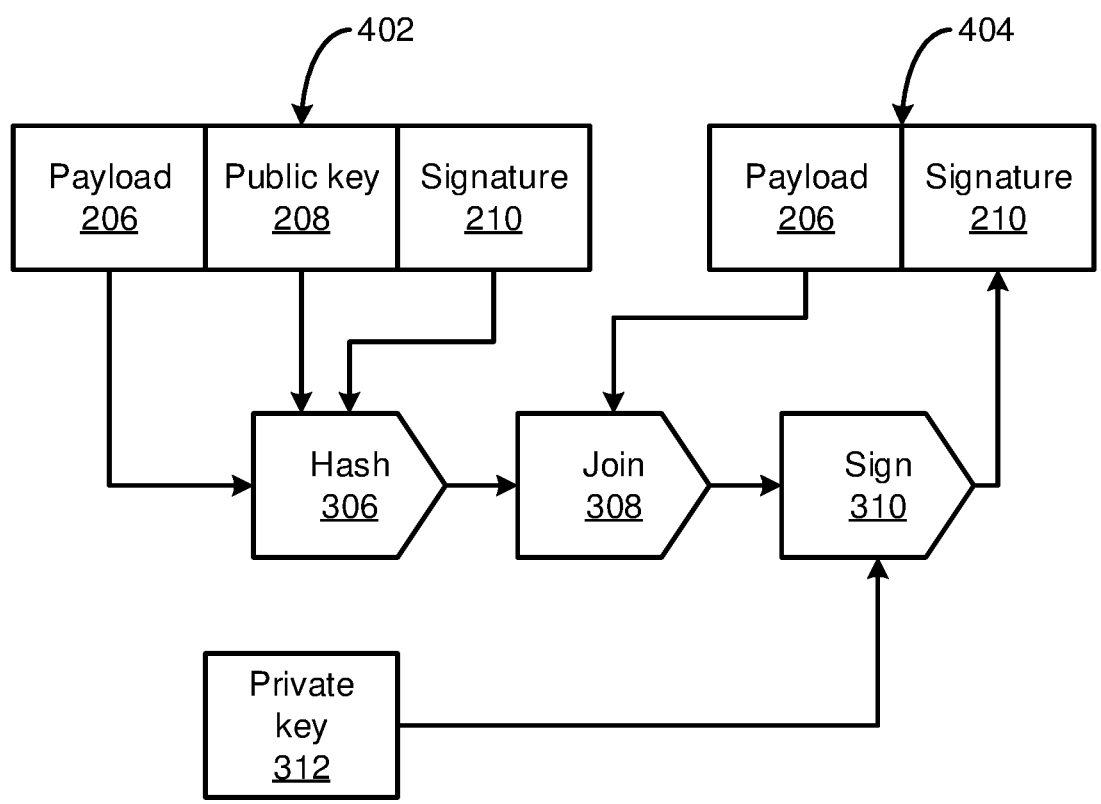
FIG. 4 is a block diagram showing the creation of a closing record in a digital ledger in accordance with an embodiment of the present invention.

Referring now to FIG. 4, the above-described relationships between a final data record 402 and a closing record 404 is shown. The hash function 306, join function 308, and sign function 310 may be implemented in the manner described above with respect to FIG. 3.

As above, the payload 206, public key 208, and signature 210 of the final data record 402 are hashed by the hash function 306. The output of the hash function 306 is then combined with only the payload 206 of the closing record 404 using the join function 308. The output of the join function 308 is then signed using the signing function 310 and the private key 312 of the final data record 402 to form the signature 210 of the closing record 404.

In the event that the private key 312 of the final data record 402 is lost, an emergency private key may be used instead. The emergency private key should be stored separately from the private key 312 and should have an associated emergency public key stored in the root record 102. In this case, instead of using public key 208 from the final data record 402, the emergency public key stored in the root record is used. The private key 312 is replaced by the emergency private key to sign the closing record 404. The input to the hash function 306 remains the same, regardless of whether private key 312 or the emergency private key is used.

Figure 5:
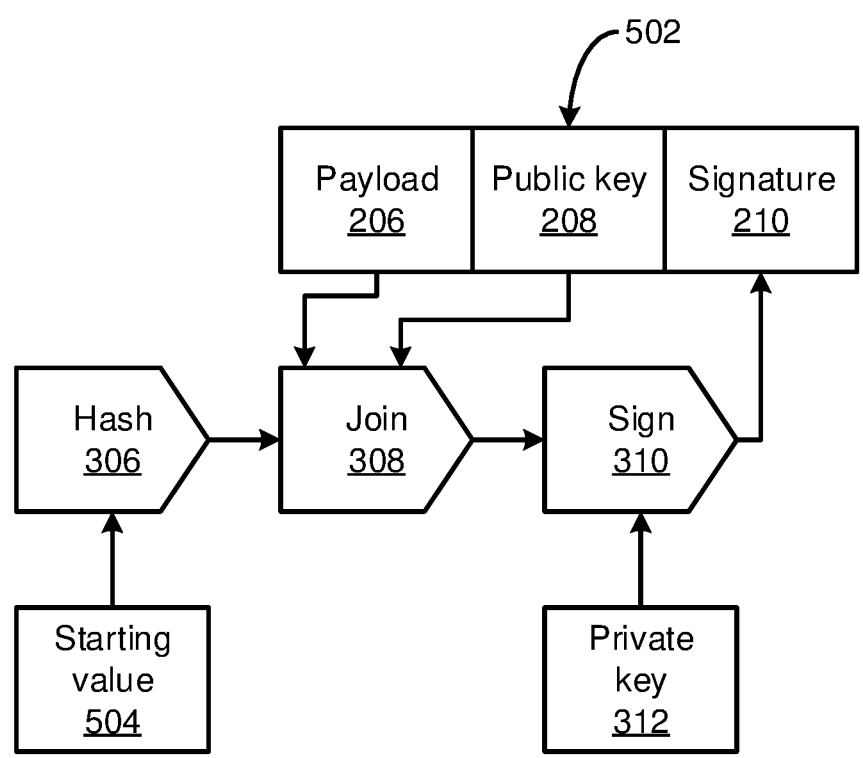
FIG. 5 is a block diagram showing the creation of a root record in a digital ledger in accordance with an embodiment of the present invention.

Referring now to FIG. 5, the above-described self-signing process for a root record 502 is shown. The hash function 306, join function 308, and sign function 310 may be implemented in the manner described above with respect to FIG. 3.

Rather than hashing all of the elements of the record, only a starting value 504 is hashed using the hash function 306. This starting value 504 is an arbitrary value that is used to indicate that the record in question is the root record 502. In some embodiments it is specifically contemplated the starting value 504 will be an empty string.

The output of the hash function 306 is combined with a public key 208 and the payload 206 by the join function 308. As noted above, the public key 208 of the root record 502 is used to verify any child record and is associated with private key 312. The output of the join function 308 is then signed by signing function 310 using the private key 312 to generate the signature 210 of the root record 502. It should be understood that this same private key 312 will later be used to sign the child record of the root record 502.

The current state of a digital ledger is maintained by the owner of the digital record and includes the information needed to add new records to the digital ledger. The state of an incomplete digital ledger therefore includes the current public and private key that will be used to sign the next record and any associated information, such as the parameters used to control the behavior of the generation procedure and any statistics regarding the usage of the current key. These additional values are defined by the application and may include any other appropriate information.

The state and, in particular, the current private key should be stored in a secure manner, such that only the owner of the digital ledger can access that information. In some embodiments, the storage also prevents duplication of the private key, even when requested by the owner, does not store more than one key pair, and permanently disposes of unneeded keys so that those keys cannot be recovered. The state is first created when the root record 102 is created, is updated during the generation of data records 104, and is disposed of during the generation of a closing record 106.

Figure 6:
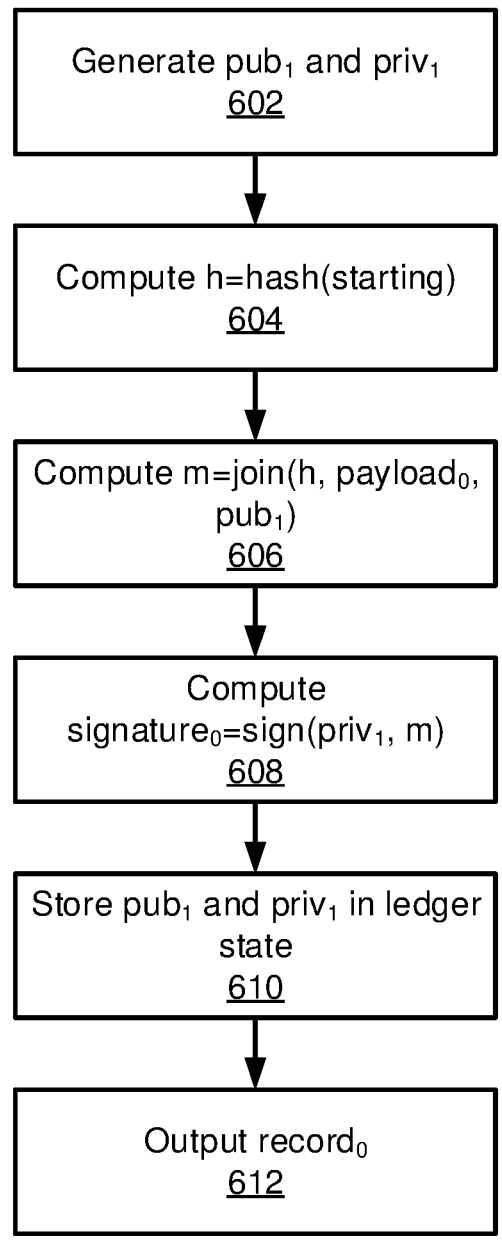
FIG. 6 is a block/flow diagram showing a method for creating a root record in a digital ledger in accordance with an embodiment of the present invention.

Referring now to FIG. 6, a method for generating a root record 102 is shown. Block 602 generates an initial public key ($pub_1$) and private key ($priv_1$) using an appropriate asymmetric cryptographic system. It should be noted that the initial key pair may be generated in advance, or may be generated specifically for the root record 102. A starting value (e.g., an empty string) is hashed in block 604 and stored as h using hash function 306. Block 606 then uses the join function 308 to join h with the payload for the root record 102 ($payload_0$) and the public key $pub_1$, storing the joined value as m. Block 608 then computes the signature of m using $priv_1$ and stores the value as $signature_0$. Block 610 creates the state for the ledger, storing $priv_1$, $pub_1$, and any other associated information. Block 612 then outputs the finished root record, which includes $payload_0$, $pub_1$, and $signature_0$.

Figure 7:
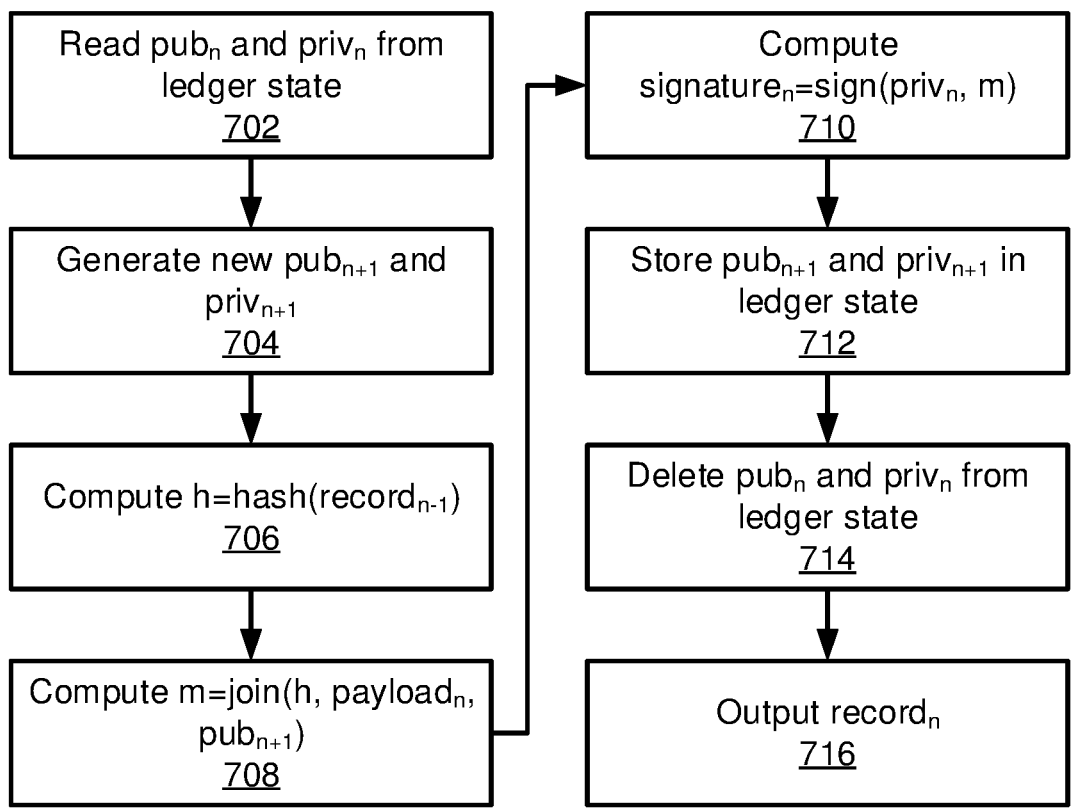
FIG. 7 is a block/flow diagram showing a method for creating a new data record in a digital ledger in accordance with an embodiment of the present invention.

Referring now to FIG. 7, a method for generating the $n^{th}$ data record is shown. Block 702 recovers the public key $pub_n$ and the private key $priv_n$ for the $n^{th}$ data record from the ledger state. Block 704 then optionally generates a new key pair for the next record, n+1 using the asymmetric cryptography system. In some embodiments the previous key pair may be reused, in which case $priv_{n+1}=priv_n$ and $pub_{n+1}=pub_1$. The signing key pair can thus be replaced at will, without affecting the structure of the existing list. This is possible because the public key used to verify any data record will always be stored in the parent record. The authenticity of the new key pair will be ensured by the integrity of all valid records that include the new public key.

Block 706 computes a hash of the entire previous record, denoted as $record_{n-1}$, using the hash function 306 and stores the hash value as h. Block 708 then combines h with the payload for the $n^{th}$ record ($payload_n$) and the public key for the next record ($pub_{n+1}$) using the join function 310, storing the combined value as m. Block 710 computes the signature of m using $priv_n$ and the signing function 310.

Block 712 then stores the new key pair in the ledger state and block 714 deletes the previous key pair from the ledger state, assuming the key pair changed in block 704. Block 716 outputs the $n^{th}$ data record, which includes $payload_n$, $pub_{n+1}$, and $signature_n$.

This process ensures the link between a child record ($record_n$) and its parent record ($record_{n-1}$) by signing the hash of the parent alongside the payload and the next public key, making it difficult to alter the parent record without breaking the signature of the current record. The link between the parent and the child is achieved by the presence of the public key 208 inside the parent that verifies the signature of the child.

The deletion and replacement of the previous key pair in block 714 makes it impossible to create new records using the previous keys if the key pair is changed. As a result, the replacement of the key locks the list because, once it is done, not even the ledger's owner will be able to modify the information stored on the digital ledger prior to the key replacement. The number of times that a key pair may be reused is defined by the implementation, but should be kept low such that, in the best-case scenario, each key pair would be used only once. However, key pair generation may impose a large overhead for some cryptographic systems, such that those skilled in the art may make a tradeoff between locking the ledger at every record and generating new records quickly.

It should be noted that, while the generation of multiple child records for a single parent record could be possible using a single key pair, the present embodiments may forbid such an operation to prevent branching in the ledger. A ledger in a tree structure would significantly increase the overhead and so is not permitted. Thus, only a single record is recognized as the child record of any parent record.

Figure 8:
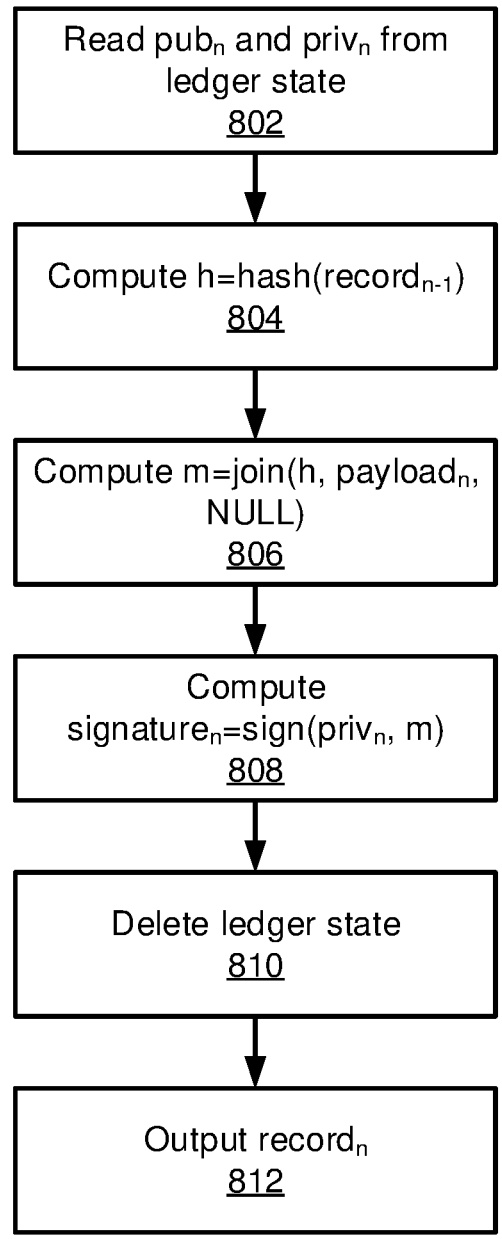
FIG. 8 is a block/flow diagram showing a method for creating a closing record in a digital ledger in accordance with an embodiment of the present invention.

Referring now to FIG. 8, a method for generating the closing record is shown. Block 802 recovers the public key $pub_n$ and the private key $priv_n$ for the $n^{th}$ data record from the ledger state. Block 804 computes a hash of the entire previous record (the final data record), denoted as $record_{n-1}$, using the hash function 306 and stores the hash value as h. Block 806 then combines h with the payload for the closing record ($payload_n$) using the join function 310, storing the combined value as m. Block 808 computes the signature of m using $priv_n$ and the signing function 310.

Block 810 deletes the ledger state, including the last public and private key pair. Block 812 outputs the closing record, which includes $payload_n$ and $signature_n$. At this point the digital ledger 100 is closed and no more records can be added.

In some circumstances, for example when the state of a ledger is lost, preventing the owner from adding new records, an alternative way to close the ledger is provided. In particular, an emergency public and private key are used to generate a special closing record according to the method above instead of the public and private keys kept in the ledger state. The emergency public key is stored in the root record, making it possible to validate the fact that the digital ledger 100 was closed using the emergency private key.

Figure 9:
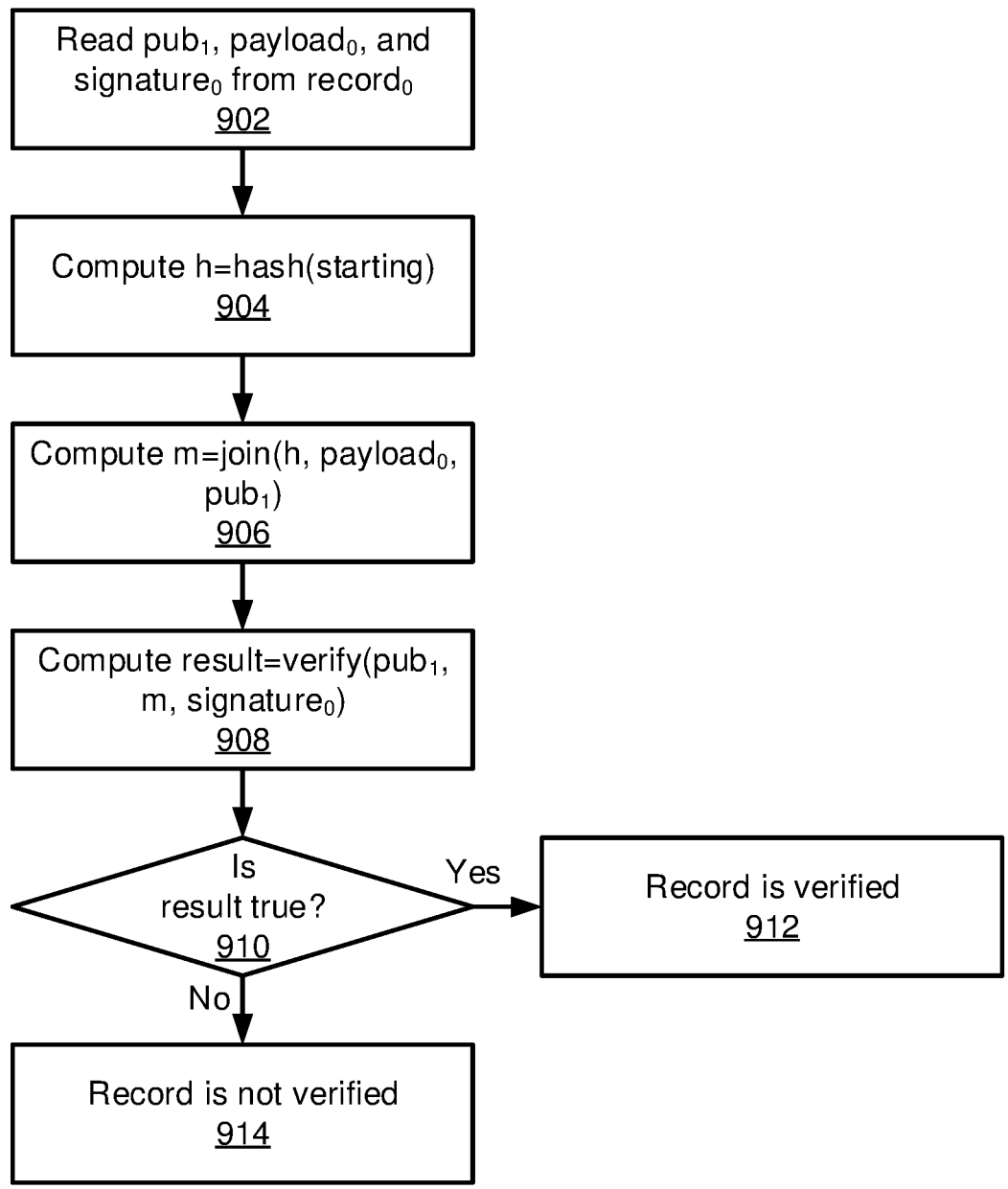
FIG. 9 is a block/flow diagram showing a method for verifying a root record of a digital ledger in accordance with an embodiment of the present invention.

Referring now to FIG. 9, method for verifying a root record 102 is shown. Block 902 reads the payload 206 ($payload_0$), public key 208 ($pub_1$), and signature ($signature_0$) from the root record ($record_0$). The starting value (e.g., an empty string) is hashed in block 904 and stored as h using hash function 306. Block 906 uses the join function 308 to join h with the payload for the root record 102 ($payload_0$) and the public key $pub_1$, storing the joined value as m.

Block 908 then verifies the root record using a verification function based on $pub_1$, m, and $signature_0$. The verification function is selected to correspond to the signing function and uses the public key to verify that the $signature_0$ is valid. Because there is no substantive content in the root record, this verification only determines that the root record is consistent with itself—the root record is self-signed, proving ownership of the private key. If the result of the verification function is "true," block 912 verifies the root record. If the result of the verification is false, block 914 marks the root record as having failed verification.

Figure 10:
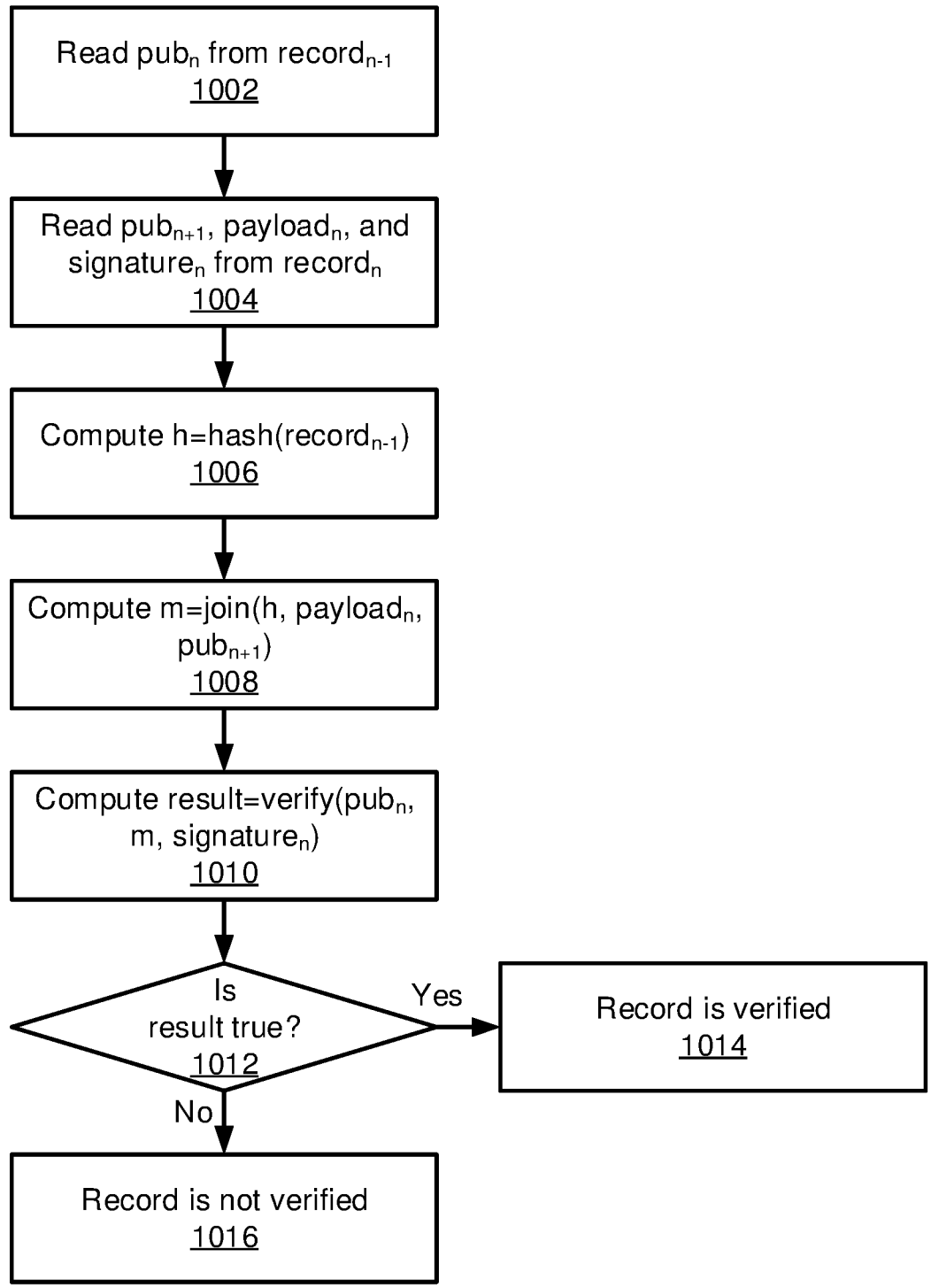
FIG. 10 is a block/flow diagram showing a method for verifying a data record in a digital ledger in accordance with an embodiment of the present invention.

Referring now to FIG. 10, a method for verifying a data record ($record_n$) is shown. Block 1002 reads the public key ($pub_n$) from the previous record ($record_{n-1}$). Block 1004 reads the present public key ($pub_{n+1}$), the payload ($payload_n$), and the signature ($signature_n$) from $record_n$. Block 1006 computes a hash of $record_{n-1}$ with the hash function 306 and stores the value as h. Block 1008 then combines h, $payload_n$, and $pub_{n+1}$ with the join function 308.

Block 1010 uses the verification function to verify m using $pub_n$ and $signature_n$. If block 1010 finds the output of the verification function to be true, block 1014 verifies $record_n$. If the result of the verification is false, block 1016 marks $record_n$ as having failed verification. This procedure ensures that $record_n$ is indeed a child of $record_{n-1}$, because $signature_n$ will be valid if, and only if, $record_{n-1}$ is the parent record and includes the correct value of $pub_n$, and if the values of $pub_{n+1}$ and $payload_n$ are correct.

The verification of a closing record is very similar to the verification of a data record, except that block 1004 then would not read out $pub_{n+1}$ and block 1008 would not include $pub_{n+1}$.

Figure 11:
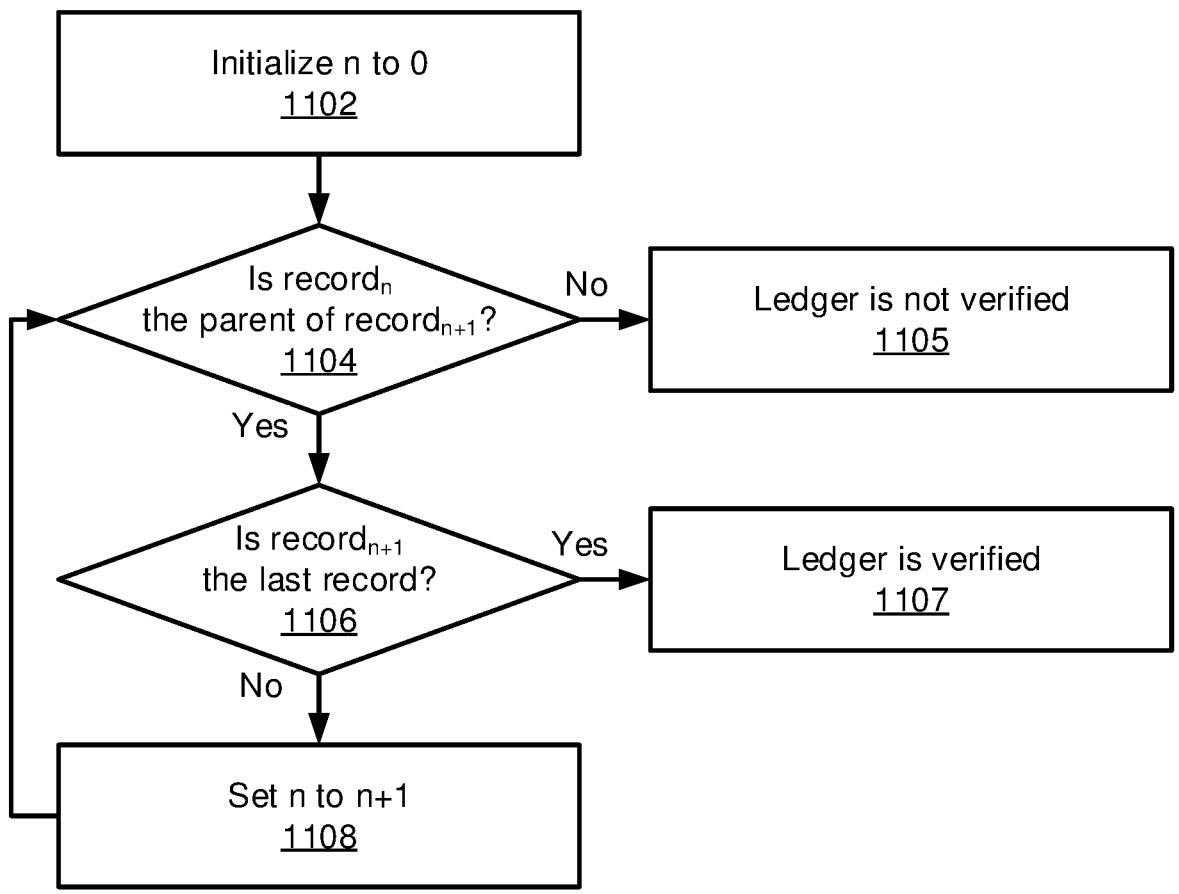
FIG. 11 is a block/flow diagram showing a method for verifying a digital ledger based on the root record in accordance with an embodiment of the present invention.

Referring now to FIG. 11, a method for verifying a digital ledger based on the root record is shown. Block 1102 initializes a counter to zero, indicating that the first record to be considered is the root record ($record_0$). Block 1104 verifies if $record_n$ is the parent of $record_{n+1}$ using the verification procedure described above. If not, block 1105 determines that the ledger is not verified because the records in the chain are not related to one another.

If the $record_n$ is shown to be the parent of $record_{n+1}$, block 1106 determines if $record_{n+1}$ is the last record in the ledger. If so, block 1107 determines that the ledger is verified and that all of the records in the ledger have the appropriate parent-child relationships. If not, block 1108 increments n and processing returns to block 1104 to check the next block.

Although the root record is explicitly described above as being the starting point for verification of the ledger, it should be recognized that verification can start at any record in the ledger other than a closing record. The record that is selected should be certified as being authentic by some external authority, for example through cross-certification as described below. When the certified record is the root record, it is possible to ensure that all records in the ledger were generated by the ledger owner. When the certified record is a data record, the verification ensures that all records prior to it are authentic and that no records were removed, inserted, or changed and that all records after it are from the same owner.

Figure 12:
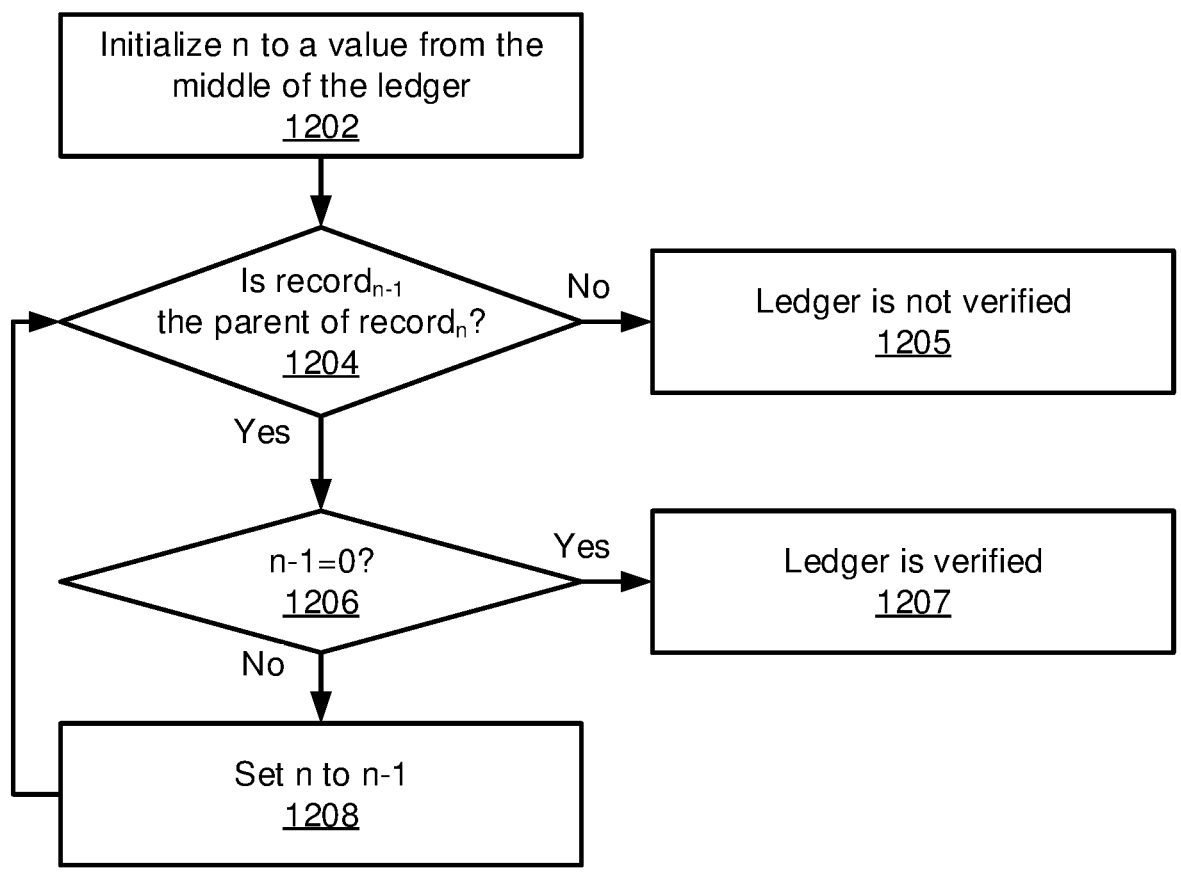
FIG. 12 is a block/flow diagram showing a method for verifying a digital ledger based on a certified record from the middle of the ledger in accordance with an embodiment of the present invention.

Referring now to FIG. 12, a method for verifying a digital ledger based on a certified record from the middle of the ledger is shown. Block 1202 initializes n to a value of a record from the middle of the ledger (e.g., a data record). Block 1204 determines whether $record_{n-1}$ is the parent of $record_n$. If not, block 1205 determines that the ledger is not verified.

If $record_{n-1}$ is the parent of $record_n$, block 1206 determines whether n−1=0. If so, block 1207 determines that the records prior to the certified record are authentic. If not, block 1208 decrements n and processing returns to block 1204.

Thus, if the list is generated by a fair implementation of the present embodiments, either the validation of the ledger from the root record to the end (FIG. 11) or the validation of the certified record to the root record (FIG. 12) will prove that the list is authentic. However, if the implementation cannot be trusted, the authenticity of the ledger can be accomplished using two certified records, where if validation from both directions is performed, then all records between the certified records are authentic.

The present embodiments thereby provide a distributed digital ledger that can verify the integrity of the stored information. The present embodiments are furthermore robust against cryptographic attacks on the underlying hash and sign/verify functions and, in addition, the digital ledger is resistant to retroactive modification even by its own owner.

The security of the digital ledger is increased by the introduction of external certifying entities. To protect against modifications by a person having the private key (e.g., the owner or an attacker who has compromised the owner), records may be certified by one or more other digital ledgers, managed by entities other than the owner of the certified ledger. Once a certification is issued for a record, all past records in the ledger will be immutable. In one particular embodiment, certification is provided by a community of users who share their respective ledgers and who also issue certifications of one another's ledgers, creating a network of trust that ensures the integrity of all records inside the community, regardless of the level of trust between any pair of users. It should be understood that the certification is not a statement that the information stored in a ledger is true or accurate, but simply that the past history of the digital ledger will not be modifiable, even if the owner of the certified record uses a compromised implementation of the digital ledger.

The community is formed by multiple users that are dedicated to ensuring the integrity of the information stored on all ledgers in the community. Each community member can have one or more ledgers. Each ledger is owned by a single member and is used to register information and also to issue certifications for the information added by other members of the community.

Instances may be shared using a distributed directory that allows each member to publish its own instance, search information about other instances and members, retrieve other instances, and post requests to individual members or to the entire community. Certification is performed using special records inside the ledgers. The larger the number of members certifying a given ledger, the more trustworthy the information stored inside is considered.

Figure 13:
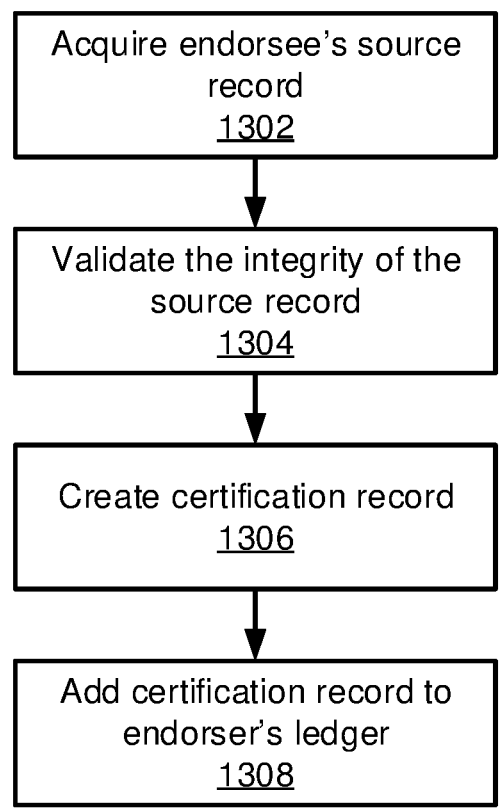
FIG. 13 is a block/flow diagram showing a method for certifying a record in a digital ledger in accordance with an embodiment of the present invention.

Referring now to FIG. 13, a method for certifying a record in a digital ledger is shown. The user performing the certification is referred to herein as the endorser, while the user whose ledger is being endorsed is referred to herein as the endorsee. A record is considered certified by another user when it is registered in that user's digital record with a certification record. The certification record endorses the integrity of the endorsee's digital ledger up to the point of the certification. The present embodiments provide that any user in the community may endorse any other at any time, without permission of the endorsee.

Block 1302 acquires a source record from the endorsee's digital ledger from a shared repository. The source record may be any record within the endorsee's digital ledger other than the root record. Block 1304 then validates the integrity of the source record against previous records in the endorsee's digital ledger. Validation of the source record may be performed as described above.

Block 1306 creates the payload for a certification record. The payload includes the identification of the endorsee's digital ledger, an index of the source record (i.e., its position within the endorsee's digital ledger), and the value of the source record or a hash thereof. Block 1308 then adds a data record to the endorser's digital ledger using the above payload to log certifying information.

The certification of records can be extended to provide cross-certification. While a single certification of a given record can be compromised if the endorser colludes with the endorsee, and while a single endorser may attempt to fake a certification to subvert the system, a record that is certified by multiple users will be robust to such attacks. In some embodiments, a record that is certified by a threshold number of users will be considered cross-certified. In other embodiments, a record that is certified by a threshold percentage of the users in the community will be considered cross-certified. The threshold may be defined by the community but should in all cases be greater than one user.

When multiple users cross-certify one another's records, a chain of certifications is created, leading to a situation where no one will be able to forge past records without breaking the certification chain at at least one point. Thus, even if all but one users in the community commit to committing a fraud and changing the history of a ledger, a single honest member will be able to guarantee that all segments endorsed by it, directly or indirectly through a certification chain, will be immutable. Thus such a fraud will only be possible if all members of a community commit to it. The level of integrity of the ledgers in the community grows as the number of cross-certified records grows.

The digital ledgers in the community are distributed across the community. This represents a distributed directory of ledgers. The directory provides the ability to retrieve any record from any digital record given an identification of the record, to store certified metadata about the instance (e.g., the state), to find all certifications issued to a given root record, to register new digital ledgers, to modify the state of a given ledger by adding application-defined special records, and to replicate records across the users as much as possible to avoid information loss.

The community may further provide information about the owner of a given ledger, an emergency key pair used to close the ledger in exceptional circumstances, and a unique identifier associated with the ledger. The information about the owner of the ledger is defined by the application that uses the ledger and by the community. The emergency key pair is created before the creation of the ledger and is used in the case where the current state of the ledger is lost. It is used solely to replace the signing key of the closing record if needed. The emergency key pair should therefore be kept safe until and unless it is needed, for example on a separate, secure medium. To protect the integrity of the owner's information and the emergency key pair, all of the information about the owner and the public key of the emergency key pair should be stored in the root record of the digital ledger. The emergency private key should be stored on a separate medium.

The ledger identifier should be a unique value that identifies the ledger. The ledger identifier may assume any unique value defined by the community. One specific embodiment uses the hash of the root record as the ledger identifier, because this value is easy to compute and because it is unlikely that two records will produce the same hash.

The first member of a ledger community creates its own digital ledger. Once a second user joins, the second user creates a digital ledger with a root record that is certified by the first member (and may certify the root record of the first member as well). Every time a new member is added to the community, the new root record is certified by at least a threshold number or threshold percentage of users in the community. This threshold may be defined by the community. This cross-certification ensures the validity of the information stored on each root record.

The distributed database of ledgers provides to the members of the community the ability to add records to a shared repository that stores the digital ledgers. The records are tested to ensure their integrity and, once added, a record cannot be removed. Any member can broadcast the addition of new records to some or all of the other members and can monitor specific ledgers. Any record from any ledger can be read at any time by any member and the directory gives the ability to find all records that certify a given record. To be adequately distributed, every record should be stored locally by at least two members of the community. When a ledger is closed with a closing record, a notification is broadcast to all members of the community.

To help maintain the ledgers in the community, a community can enforce locking of ledgers by cross-certification. For example, the ledgers can be locked after a certain time period or after a number of new records have been added. Once a ledger has been locked by, e.g., certifying the last record in the ledger's list, no one is able to create new records using past private keys.

Although the records of all ledgers are fully public to make it possible to validate them, the ledgers can still be used to store private documents. The original publisher may assign a unique identification to a document. The identification uniquely identifies the publisher and the document itself. Once the identification has been defined, a hash of the document is also computed. This pair, alongside with other information about the document, such as a publication date, is added to the publisher's digital ledger. Once the document is added and has been endorsed by other members of the community, the document will be forever registered inside the ledger, preventing it from being modified. The actual value of the document can be kept private until the integrity of the document needs to be verified by a third party. At that point, the third party can generate a hash of the document and compare the hash to the stored value, confirming that the document was stored at the publication date and has not been modified since that time.

The present embodiments may be employed for a variety of applications, including version control systems, auditing, financial services, legal documentation, etc. Furthermore, because the digital ledger is efficient and lightweight, it can be implemented within a wide range of hardware devices, such as smart cards. This makes it possible to create a digital ledger community to provide the authentication and authorization of transactions for a financial service provider.

In such an application, the financial service provider would issue a ledger to each customer and at least one to itself. Every time a customer wants to perform a transaction, the customer adds an entry to their ledger with an authorization code of the transaction and shares the record with the provider. The provider then validates the record and issues a new record with the endorsement of the customer's ledger, making it impossible to deny the authorization. The customer may then endorse the endorsement in their own ledger, making the result of the transaction unmodifiable.

In another application, the digital ledger can be used to notarize smart contracts. Because the ledger can only be added to by its owner, it can be used as a replacement to a digital signature with the advantage that, once signed, all parties will be able to confirm it and also ensure that the signature will be registered forever. Furthermore, if implemented as a private document, all parties will be able to verify that the document was signed, but no third parties will be able to see the actual terms until a publication is needed (for example, during a legal dispute between the parties.

One party would then generate the contract and would sign it by adding a record with the document identification and a hash of the document inside their own digital ledger. All other parties that will sign the document perform the same operation using the same identification and the same hash. Each party may then endorse the ledgers of the other parties, locking the signatures.

The ability to implement the digital ledger in hardware devices also makes it possible to provide digital ledgers in, for example, cameras and sound recorders. These devices can register a signature of the recordings they make, allowing verification of the integrity of the recordings. By creating internal digital ledger records for each recording (including a hash of the recording) and having those records endorsed by other users, strong cryptographic proof can be obtained to show that the recordings were not tampered with after being recorded.

The digital ledger can also be used to implement a version control system, controlling the authorship and integrity of versions of documents. Each author has their own digital ledger that is used to authenticate and register changes. The version control repository also maintains its own ledger. An author creates a new record in its own digital ledger for each modification to the repository. The repository then validates and registers the change into its own digital ledger, registering the result of the change request and endorsing the author's ledger. A chain of trust can be built by the author then validating the repository's ledger to ensure traceability of each change in the system.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 14:
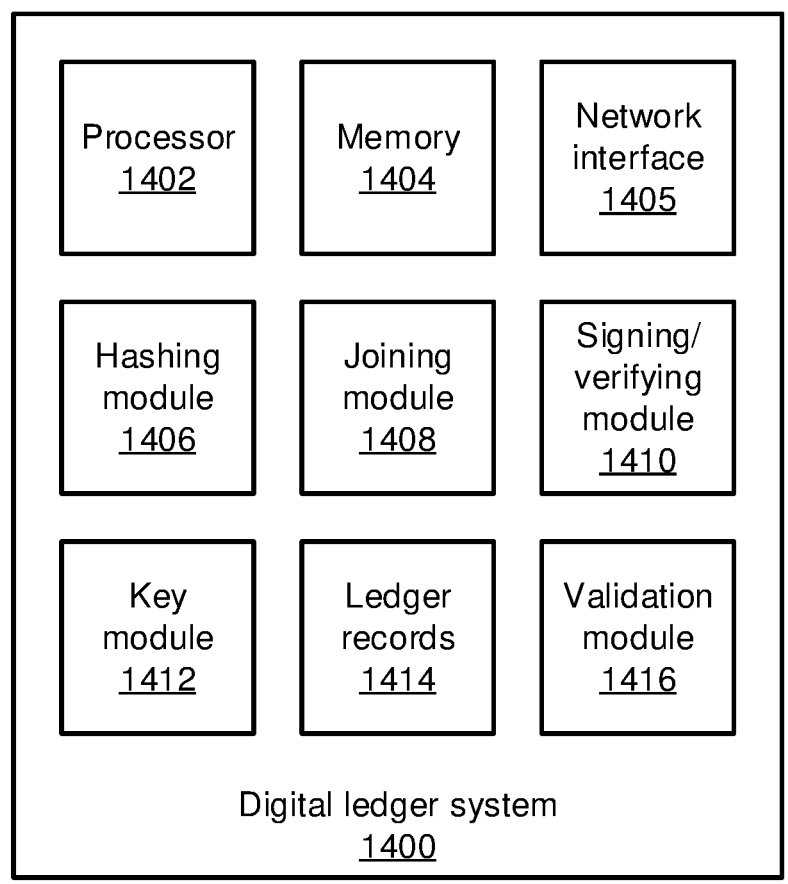
FIG. 14 is a block diagram of a digital ledger system in accordance with an embodiment of the present invention.

Referring now to FIG. 14, a digital ledger system 1400 is shown. The system 1400 includes a hardware processor 1402 and memory 1404. The system 1400 further includes a network interface 1405 that allows the system 1400 to communicate with other digital ledger systems, providing the ability to share and endorse digital ledger records. In addition, the digital ledger system 1400 includes one or more functional modules that may, in some embodiments, be implemented as software that is stored in memory 1404 and executed by processor 1402. In other embodiments, the functional modules may be implemented as one or more discrete hardware components in the form of, e.g., application specific integrated chips or field programmable gate arrays.

A hashing module 1406 implements a hashing function, a joining module 1408 implements a join function, and signing/verifying module 1410 implements a cryptographic function for producing and verifying cryptographic signatures. A key module 1412 works in conjunction with the signing/verifying module 1410 to generate public and private key pairs. These modules work in tandem to produce ledger records 1414 that are stored in memory 1404 and that may be transmitted by the network interface 1405 to other members of a ledger community.

A validation module 1416 operates on ledger records 1414 to validate the ownership and authenticity of records using the hashing module 1406, joining module 1408, and signing/verifying module 1410 as described in detail above. The validation module 1416 can also operate on records from another digital ledger system. Upon validation, a new certification record can be created and stored with the ledger records 1414 to certify the ledger of the other digital ledger system.

Figure 15:
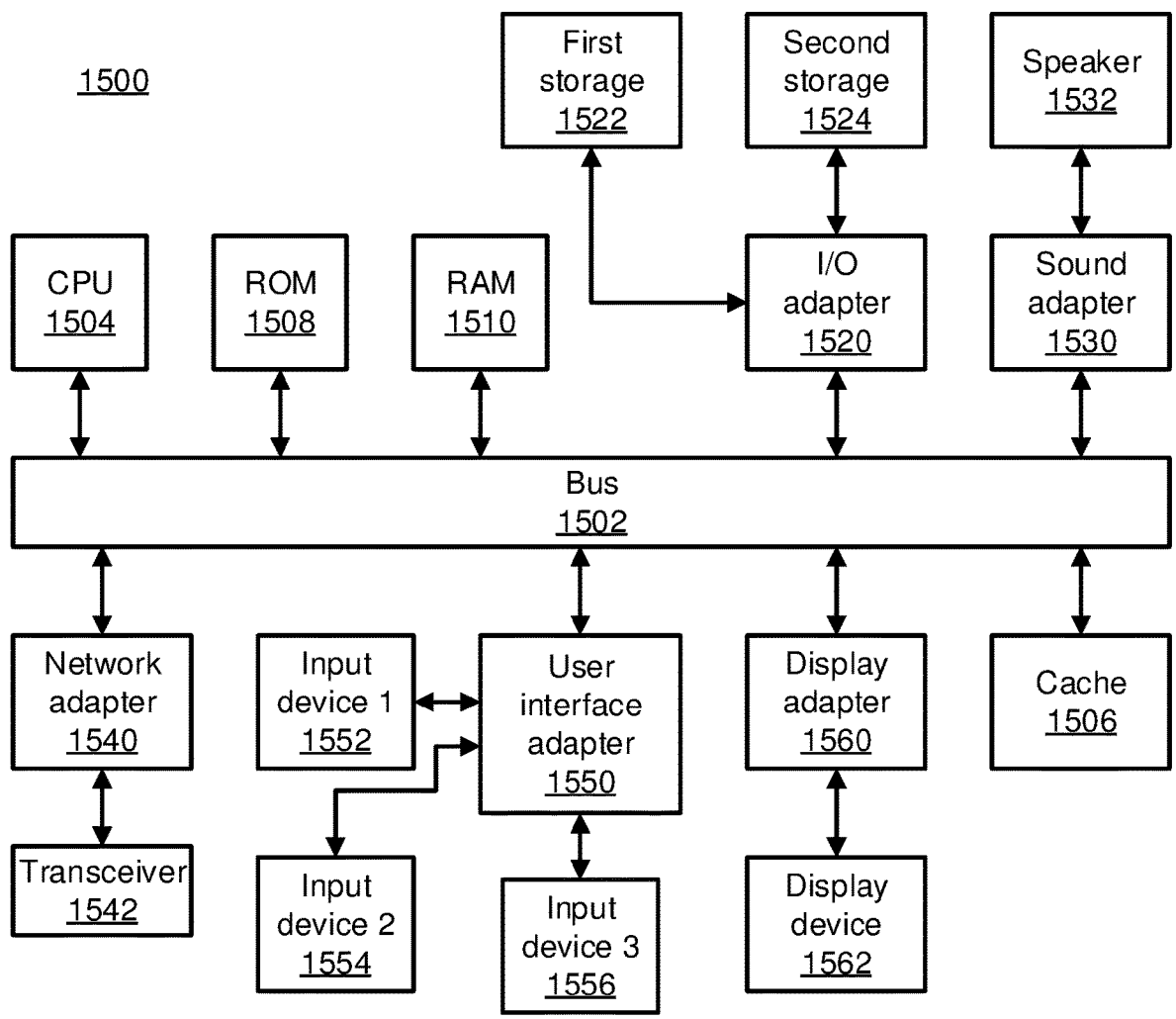
FIG. 15 is a block diagram of a processing system in accordance with an embodiment of the present invention.

Referring now to FIG. 15, an exemplary processing system 1500 is shown which may represent the digital ledger system 1400. The processing system 1500 includes at least one processor (CPU) 1504 operatively coupled to other components via a system bus 1502. A cache 1506, a Read Only Memory (ROM) 1508, a Random Access Memory (RAM) 1510, an input/output (I/O) adapter 1520, a sound adapter 1530, a network adapter 1540, a user interface adapter 1550, and a display adapter 1560, are operatively coupled to the system bus 1502.

A first storage device 1522 and a second storage device 1524 are operatively coupled to system bus 1502 by the I/O adapter 1520. The storage devices 1522 and 1524 can be any of a disk storage device (e.g., a magnetic or optical disk storage device), a solid state magnetic device, and so forth. The storage devices 1522 and 1524 can be the same type of storage device or different types of storage devices.

A speaker 1532 is operatively coupled to system bus 1502 by the sound adapter 1530. A transceiver 1542 is operatively coupled to system bus 1502 by network adapter 1540. A display device 1562 is operatively coupled to system bus 1502 by display adapter 1560.

A first user input device 1552, a second user input device 1554, and a third user input device 1556 are operatively coupled to system bus 1502 by user interface adapter 1550. The user input devices 1552, 1554, and 1556 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 1552, 1554, and 1556 can be the same type of user input device or different types of user input devices. The user input devices 1552, 1554, and 1556 are used to input and output information to and from system 1500.

Of course, the processing system 1500 may also include other elements (not shown), as readily contemplated by one of skill in the art, as well as omit certain elements. For example, various other input devices and/or output devices can be included in processing system 1500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 1500 are readily contemplated by one of ordinary skill in the art given the teachings of the present principles provided herein.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for generating a new record in a digital ledger, comprising:
   hashing a payload, public key, and signature of a parent record to generate a hash value;
   creating a new record with a new payload and a new public key;
   combining the hash value with the new payload and the new public key to generate a message value;
   generating a signature of the new record using the message value and a private key corresponding to the public key of the parent record; and
   adding the signature of the new record to the new record.

2. The method of claim 1, further comprising generating a new key pair including the new public key and a new private key.

3. The method of claim 1, further comprising generating a closing record after generating the new record.

4. The method of claim 3, wherein generating the closing record comprises:
   hashing the new payload, new public key, and signature of the new record to generate a closing hash value;
   creating a closing record with a closing payload and no public key;
   combining the closing hash value with the closing payload to generate a closing message value;
   generating a signature of the closing record using the closing message value and the new private key; and
   adding the signature of the closing record to the closing record.

5. The method of claim 1, further comprising generating a root record before generating the new record.

6. The method of claim 5, wherein generating the root record comprises:
   generating a root keypair including a root public key and a root private key;
   hashing a root payload and a ledger start value to generate a root hash value;
   creating a root record with the payload and the root public key;
   combining the hash value with the root public key to generate a root message value;
   generating a root signature of the root record using the root message value and the root private key; and
   adding the root signature to the root record.

7. A non-transitory computer readable storage medium comprising a computer readable program for generating a new record in a digital ledger, wherein the computer readable program when executed on a computer causes the computer to perform the steps of:
   hashing a payload, public key, and signature of a parent record to generate a hash value;
   creating a new record with a new payload and a new public key;
   combining the hash value with the new payload and the new public key to generate a message value;
   generating a signature of the new record using the message value and a private key corresponding to the public key of the parent record; and
   adding the signature of the new record to the new record.

8. A digital ledger system, comprising:
   a hardware processor;
   a memory configured to store computer program instructions that, when executed by the hardware processor, cause the digital ledger system to execute one or more functional modules, including:
   a hashing module configured to compute a hash of a value;
   a joining module configured to join multiple input values into a single output bit value;
   a signing/verifying module configured to produce a signature of a value using a private key and to verify the authenticity of a value using a public key associated with the private key;
   a key module configured to generate key pairs, each key pair having an associated private key and public key; and
   a new record module configured to:
      hash a payload, public key, and signature of a parent record to generate a hash value using the hashing module;
      create a new record with a new payload and a new public key;
      combine the hash value with the new payload and the new public key to generate a message value using the joining module;
      generate a signature of the new record using the message value and a private key corresponding to the public key of the parent record using the signing/verifying module; and
      add the signature of the new record to the new record.

9. The system of claim 8, wherein the new record module is further configured to generate a closing record after generating the new record.

10. The system of claim 8, wherein the new record module is further configured to:
    hash the new payload, new public key, and signature of the new record to generate a closing hash value using the hashing module;
    create a closing record with a closing payload and no public key; combine the closing hash value with the closing payload to generate a closing message value using the joining module;
    generate a signature of the closing record using the closing message value and the new private key using the signing/verifying module; and add the signature of the closing record to the closing record.

11. The system of claim 8, wherein the new record module is further configured to generate a root record before generating the new record.

12. The system of claim 9, wherein the new record module is further configured to:
generate a root keypair including a root public key and a root private key using the key module;
hash a root payload and a ledger start value to generate a root hash value using the hashing module;
create a root record with the payload and the root public key;
combine the hash value with the root public key to generate a root message value using the joining module;
generate a root signature of the root record using the root message value and the root private key using the signing/verifying module; and
add the root signature to the root record.

13. The system of claim 8, wherein the one or more functional modules further include a validation module configured to validate a current record in a digital ledger, the validation module being configured to:
compute a hash of a parent payload, a parent public key, and a parent signature from a parent record to generate a parent hash value using the hashing module;
combine the hash value with a payload of a current record and a public key for the current record to generate a current message value using the joining module; and
verify the current message value using the parent public key and a signature of the current record according to a cryptographic system using the signing/verifying module.

14. The system of claim 11, wherein the validation module is further configured to iterate the verification of records until a root record is verified.

15. The system of claim 11, wherein the validation module is further configured to, before validating the current record:
compute a hash of a payload of the current record, the public key for the current record, and the signature of the current record to generate a current hash value using the hashing module;
combine the hash value with the payload of the closing record and no public key to generate a closing message value using the joining module; and
verify the closing message value using the public key for the current record and a signature of the closing record according to the cryptographic system to validate the closing message using the signing/verifying module.

* * * * *